United States Patent [19]
Peterson et al.

[11] 3,752,135
[45] Aug. 14, 1973

[54] VEHICLE FUEL TANK VENTING SYSTEM

[75] Inventors: Donald W. Peterson, Fenton; Floyd A. Wyczalek, Birmingham, both of Mich.

[73] Assignee: General Motors Corporation, Detroit, Mich.

[22] Filed: Nov. 26, 1971

[21] Appl. No.: 202,263

[52] U.S. Cl. .............................. 123/136, 220/85 VR
[51] Int. Cl. .......................................... F02m 59/00
[58] Field of Search ................ 123/136; 220/85 VR

[56] References Cited
UNITED STATES PATENTS
| | | | |
|---|---|---|---|
| 3,542,239 | 11/1970 | Latvala | 123/136 |
| 3,614,960 | 10/1971 | Pfrengle | 123/136 |
| 3,685,504 | 8/1972 | Torazza | 123/136 |
| 3,687,335 | 8/1972 | Hunter | 123/136 |

OTHER PUBLICATIONS

Chrysler Evaporation Control System, SAE Journal, Jan. 1970, p. 2–7

*Primary Examiner*—Laurence M. Goodridge
*Assistant Examiner*—Cort Flint
*Attorney*—J. L. Carpenter and C. K. Veenstra

[57] ABSTRACT

A venting system for a vehicle fuel tank has a vent line which extends a selected distance above, below, and to either side of the fuel tank to contain liquid fuel against loss to the atmosphere irrespective of the attitude of the vehicle.

4 Claims, 3 Drawing Figures

PATENTED AUG 14 1973　　　　　　　　　　　　3,752,135

INVENTORS
Donald W. Peterson, &
BY Floyd R. Wyczalek

C. K. Veenstra
ATTORNEY

VEHICLE FUEL TANK VENTING SYSTEM

This invention relates to a venting system for a vehicle fuel tank and more particularly to a construction of the vent line which will prevent loss of liquid fuel irrespective of the attitude of the fuel tank. This result is achieved by routing the vent line longitudinally a selected distance past the front and rear of the fuel tank, laterally a selected distance past each end of the fuel tank, and vertically a selected distance above and below the fuel tank. This routing of the vent line provides a standpipe effect which completely contains liquid fuel irrespective of the position of the vehicle.

The details as well as other objects and advantages of this invention are set forth below and shown in the drawings in which.

Figure 1:
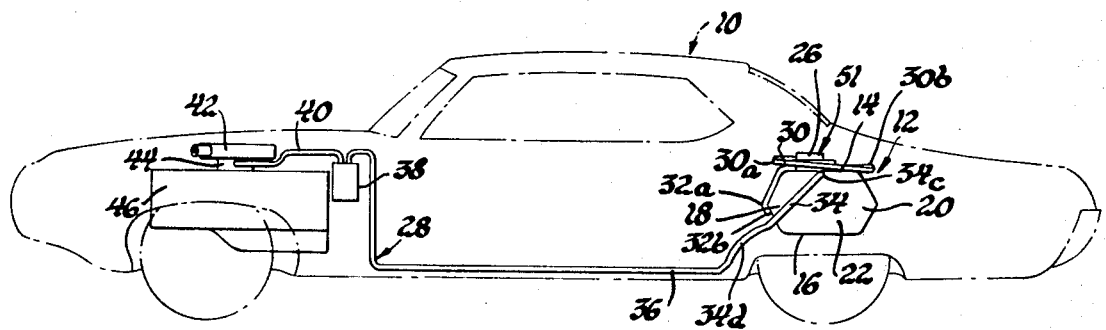
FIG. 1 is a side elevational view of a vehicle having the novel fuel tank venting system disposed therein and illustrating the vertical routing of the vent line.
Figure 2:
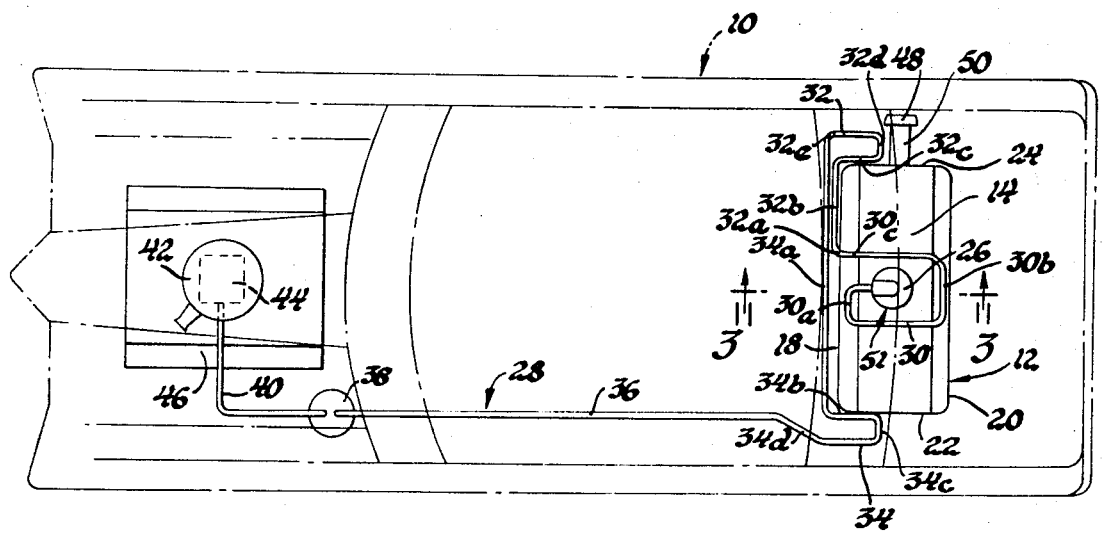
FIG. 2 is a plan view of the vehicle illustrating the lateral routing of the vent line.

Referring first to FIGS. 1 and 2, a vehicle 10 has a fuel tank 12 disposed therein. As here illustrated, the fuel tank 12 is disposed over the rear axle of the vehicle, but such a location is only exemplary and the use of this invention is not limited to a fuel tank in such a location.

Fuel tank 12 includes upper and lower walls 14 and 16, forward and rear walls 18 and 20, and end walls 22 and 24. A dome 26 extends upwardly from upper wall 14 for purposes described below.

A vent line 28 extends from dome 26 and first comprises a horizontal loop 30 disposed above the tank upper wall 14 and extending a selected distance forwardly of the tank front wall 18 at 30a, a selected distance rearwardly of the tank rear wall 20 at 30b, and again forwardly of the tank front wall 18 at 30c. Vent line 28 next comprises a loop 32 which extends downwardly at 32a in front of the tank front wall 18 from above the tank upper wall 14 to a level lower than the tank lower wall 16, laterally at 32b lower than the tank lower wall 16 to a vertical portion 32c disposed outwardly a selected distance from the tank end wall 24 and extending upwardly a selected distance higher than the tank upper wall 14 at 32d and downwardly to a level lower than the tank lower wall 16 at 32e. Vent line 28 then comprises another loop 34 which extends laterally at 34a a selected distance lower than the tank lower wall 16 to a vertical portion 34b disposed outwardly a selected distance from tank end wall 22 and extending upwardly a selected distance higher than the tank upper wall at 34c and downwardly below the tank lower wall at 34d. It will be noted that loops 32 and 34 are not fully vertical but instead are inclined whereby portions 32d and 34c are disposed about midway between the tank front and rear walls 18 and 20.

Such a routing of vent line 28 contains liquid fuel against loss from fuel tank 12 to the atmosphere irrespective of the attitude of vehicle 10 and fuel tank 12.

Vent line 28 then comprises a portion 36 extending forwardly to a fuel vapor storage unit 38, such as a charcoal canister, which contains fuel vapor against loss to the atmosphere. A purge line 40 extends from the vapor storage unit 38 to the air cleaner 42, carburetor 44, or other portion of the induction system of the vehicle engine 46 whereby fuel vapors emitted from fuel tank 12 may be consumed during engine operation.

Dome 26 serves not only as a portion of the venting system elevated above the upper wall 14 of fuel tank 12 but also may be utilized as a liquid-vapor separator which prevents flow of liquid fuel into vent line 28. To serve this purpose, dome 26 may comprise a hollow enclosure providing an expansion chamber opening from fuel tank 12 to vent line 28 or one of the various standpipe configurations which have been utilized to achieve the liquid-vapor separator function. Preferably, however, dome 26 contains the vent control unit 51 shown in FIG. 3 to achieve this result.

Figure 3:
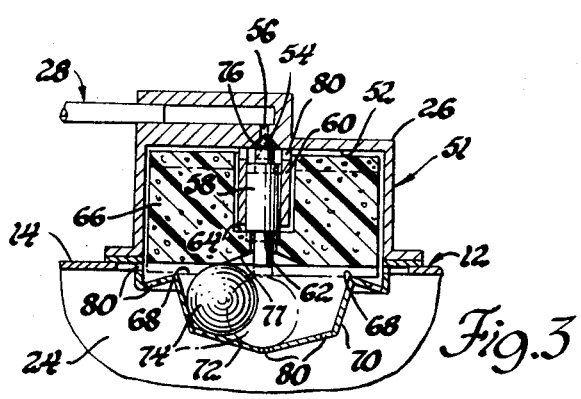
FIG. 3 is an enlarged sectional view of the tank vent control unit, taken generally along line 3—3 of FIG. 2.

Referring to FIG. 3, dome 26 is formed to provide a portion of vent line 28 and a chamber 52. A valve seat 54 surrounds an opening 56 from chamber 52 to vent line 28. A valve member 58 associated with valve seat 54 controls flow through opening 56. The dot-dash line position of the elements in FIG. 3 shows the valve-open condition of the unit 51 and the solid line position shows the valve-closed condition.

Valve member 58 is guided by a sleeve 60 and has a downwardly facing shoulder 62. Shoulder 62 is received and supported by a shelved portion 64 of an annular float 66. Upon an increase in the fuel level adjacent chamber 52, above that associated with normal vehicle operation, float 66 will rise and lift valve 58 into engagement with valve seat 54. This prevents any loss of liquid fuel into vent line 28.

It will be noted that in the valve-open position, float 66 rests on an annular ledge 68. A wall 70, which may be either cylindrical or conical as shown, extends downwardly from ledge 68 to a conical ramp 72. A weighted ball 74 rests on ramp 72. During vehicle maneuvers — such as acceleration, deceleration or cornering — which might cause a surge of liquid fuel into vent line 28 before float 66 can float upwardly, ball 74 is forced radially outwardly along ramp 72. Ramp 72 lifts ball 74 which raises float 66 to engage valve 58 against seat 54. This prevents any loss of liquid fuel into vent line 28 during such maneuvers.

Wall 70 is disposed at a selected distance along ramp 72 to limit travel of ball 74, thereby preventing ball 74 from being wedged between ramp 72 and float 66 and also preventing damage to or sticking of the resilient tip 76 on valve 58 when it engages seat 54.

It will be noted that the lower surface of float 66 is formed with a recess 77, shown in FIG. 3 as being conical. In the event fuel tank 12 should be inverted, float 66 would float toward ledge 68; absent recess 77, float 66 would tend to hold ball 74 away from valve 58 and reduce the closing force on valve 58. Recess 77 permits the full weight of ball 74 to act on the stem of valve 58 which extends through the central opening in float 66, thereby providing for the maximum closing force on valve 58 to prevent loss of liquid fuel.

Valve unit 51 includes a plurality of openings 80 which permit the passage of fuel vapor and air between tank 12 and vent line 28, some of which also allow liquid fuel to drain from chamber 52.

With this construction, vent control unit 51 serves as a liquid-vapor separator, preventing loss of liquid fuel from tank 12 through vent line 28 while permitting fuel vapor to bleed out of tank 12 through vent line 28.

It will be appreciated, of course, that the venting system herein disclosed serves not only to contain fuel against loss from tank 12 to the atmosphere but also to admit air into tank 12 as fuel is withdrawn therefrom. In addition, appropriate valves may be incorporated in vent line 28 or the otherwise sealed cap 48 closes the filler pipe 50 for tank 12 for the purpose of regulating pressure and vacuum conditions within tank 12.

It also will be appreciated that use of the vent line configuration described herein with the vent control unit also described herein respresents, to at least some extent, redundant protective measures. Either of the described improvement would be useful in a situation where the other is not present.

We claim:

1. A venting system for a vehicle fuel tank having an upper wall, a lower wall, and a pair of end walls, said venting system comprising means defining a vent opening in said upper wall and a vent line connected to said vent opening and extending in one direction transverse to the longitudinal axis of the vehicle at least a selected distance beyond one of said end walls, extending in the direction opposite to said one direction at least said selected distance beyond the other of said end walls, extending vertically at least said selected distance above said upper wall, and extending vertically at least said selected distance below said lower wall, said venting system thereby containing liquid fuel against loss to the atmosphere irrespective of the attitude of said vehicle about its longitudinal axis.

2. The venting system of cliam 1 wherein said vent line extends to a fuel vapor storage unit to thereby contain fuel vapor against loss to the atmosphere.

3. The venting system of claim 1 which includes a liquid-vapor separator dome member secured to and extending above said upper wall to thereby contain liquid fuel against surging from said tank to said vent line, said dome member defining said vent opening and comprising that portion of said vent line extending above said upper wall.

4. A venting system for a vehicle fuel tank having an upper wall, a lower wall, a forward wall, a rearward wall, and a pair of end walls, said venting system comprising means defining a vent opening in said upper wall and a vent line connected to said vent opening, said vent line including a horizontal portion forward of and higher than said tank upper wall, a horizontal portion rearward of said tank rear wall and higher than said tank upper wall, a vertical portion forward of said tank front wall, a horizontal portion forward of said tank front wall and lower than said tank lower wall, a vertical portion outwardly of one of said tank end walls, a horizontal portion outwardly of said one tank end wall and higher than said tank upper wall and approximately midway between said tank front and rear walls, another horizontal portion forward of said tank front wall and lower than said tank lower wall, a vertical portion outwardly of the other of said tank end walls, a horizontal portion outwardly of said other tank end wall and higher than said tank upper wall and approximately midway between said tank front and rear walls, and a portion lower than said tank lower wall, said venting system thereby containing liquid fuel against loss to the atmosphere irrespective of the attitude of said vehicle.

* * * * *